April 19, 1960  G. F. SIEDOW  2,933,121
RUBBER VALVE
Filed March 27, 1958

*INVENTOR.*
GEORGE F. SIEDOW
BY
*W. A. Fraser*
ATTY.

United States Patent Office 2,933,121
Patented Apr. 19, 1960

2,933,121
RUBBER VALVE

George F. Siedow, Akron, Ohio, assignor to The Firestone Tire & Rubber Company, Akron, Ohio, a corporation of Ohio Application March 27, 1958, Serial No. 724,291

3 Claims. (Cl. 152—429)

This invention relates to an improved combination of a tubeless tire with a rubber inflation valve in the sidewall and to such a valve itself.

In the manufacture of tubeless tires embodying sidewall valves, it is customary to mold an annular hole in the sidewall of the tire in which the rubber valve may be mounted. This molding is accomplished by placing a metal mandrel with one end against the sidewall tire mold and, as the tire is being vulcanized and molded, allowing the mandrel to penetrate the sidewall, cord body and the inner liner of the tire, to mold a passage between the inside and the outside of the tire.

A difficulty of the aforedescribed method is the fact that the mandrel, in punching its way through the hot, soft rubber and between the cords of the tire, lifts the cords of the body of the tire, particularly those nearest the band ply, inwardly towards the air chamber, so that in the finally vulcanized tire the cords around the hole project upwardly in the tire carcass toward the air chamber of the tire. In some instances these cords project to the inner surface of the tire and are exposed to the inflation air, with the result that air is wicked from the air cavity into remote portions of the tire along the cords and cause tire failure.

The difficulties of the prior art are overcome in the present invention through use of a novel valve plug having a special flange designed to seal off the edges of the inner opening of the hole and thereby protect the cords from the inflation air.

It is, therefore, an object of the invention to provide an improved tubeless tire, and sidewall valve combination. It is a further object of the invention to provide an improved rubber valve adapted to cooperate with a tubeless tire to prevent wicking of air into the cords of the tire. Yet another objection of the invention is to provide means to prevent the escape of air into the tire body from the air chamber in the vicinity of the sidewall valve.

These and other objects of the invention will be more readily understood with reference to the specification, claims and drawings of which:

Figure 1:
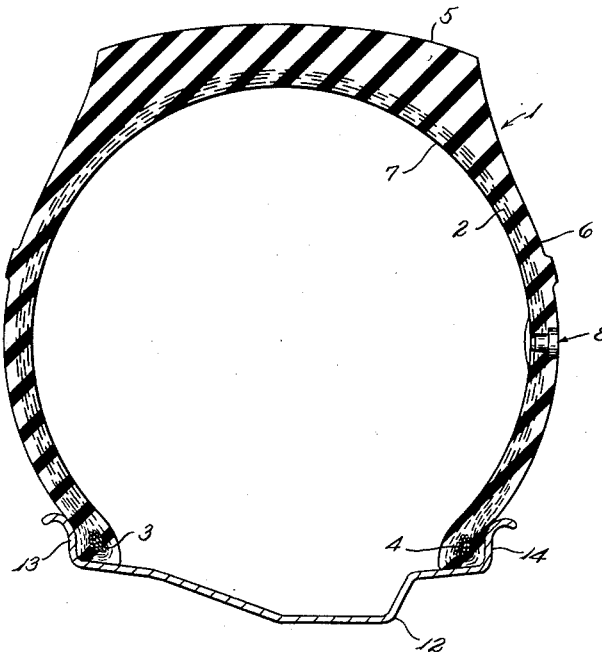
Fig. 1 is a section view partially in perspective showing a tubeless tire of the invention mounted on a wheel rim.

Referring to Fig. 1, a tubeless tire, generally indicated at 1, is comprised of a rubberized fabric body portion 2, terminating at each edge in annular beads 3 and 4, and capped with a rubbery tread portion 5 superimposed and bonded as by vulcanization thereto. The tread portion extends down the outside of the tire to form sidewall 6, while the inner peripheral surface of the inside of the tire is covered with the rubbery inner liner portion 7. The tire beads 3 and 4 are mounted on flanges 13 and 14, respectively of rim 12, and provision is made for inflation of the tire, in view of the invention through inflation valve 8. It will be noted that the rim does not have an inflation valve, but this is not critical in the invention since it is just as satisfactory with a rim valve or without a rim valve.

Figure 2:
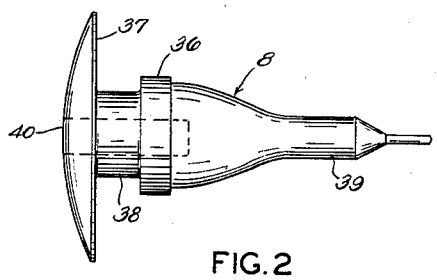
Fig. 2 is a side elevation of a rubber valve of the invention.
Figure 3:
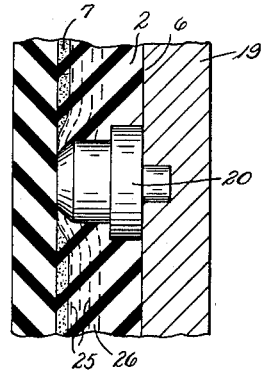
Fig. 3 is a fragmentary side view in section of the valve of the invention mounted in the tire.
Figure 4:
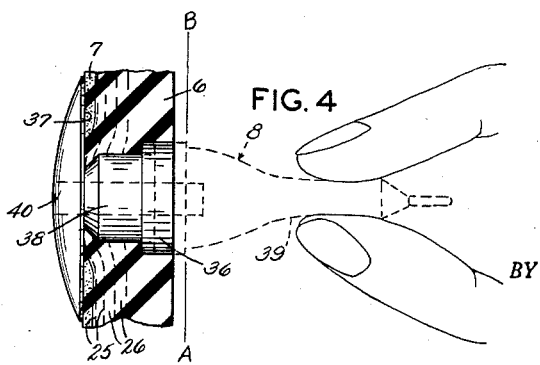
Fig. 4 is a fragmentary sectional view of the valve mounted in the sidewall of the tubeless tire before the outer end is cut off.

In the conventional manner of forming a hole for the valve 8 in the sidewall of the tire, a mandrel 20 (Fig. 3) is abutted against mold 19 and pushed into the side of the hot, soft tire during vulcanization to penetrate from the outside to the inside. The resulting hole has a shape generally complementary to the configuration of the mandrel. A disadvantage of the prior art has been the fact that the mandrel 20 in piercing the sidewall of the tire, forces the cords 25 through the hot rubber inwardly toward the band ply, and sometimes into and through the inner liner until they are exposed to inflation air in the inner cavity of the tire. This condition exists because during vulcanization of the tire the inner liner, the sidewall 6 and the rubbery material 26 with which the cords are rubberized become soft and yieldable and are distended as the mandrel is forced into the sidewall of the tire. Air from the cavity of the tire enters cords 25 at the point where they are exposed at the inner peripheral surface of the tire and wicks into remote portions of the tire to oxidize the rubber during operation of the tire and cause failure. Referring to Fig. 2, a rubber sidewall valve generally indicated at 8 is comprised of outer flange 36 and an inner flange 37, separated by column 38, and provided with a shank 39. For inflation of the tire an air passage 40 in the shape of a slit pierces the plug from the outer surface of the inner flange 37 through column 38 through inner flange 36 and partially into shank 39. The passage terminates in the valve at a point adjacent the outer surface of flange 36 so that when the shank 39 is severed from the valve the passage will be exposed. Plug 8 is thrust into the molded hole from inside the tire and pulled outwardly therethrough by shank 39 until the plug attains the position shown in Fig. 4. The diameter of the outer flange 36 is slightly greater than its seat in the sidewall of the tire, while the diameter of the column 38 is slightly greater when the column is under some tension than the diameter of its seat in the fabric body portion of the tire. However, when tension is placed on column 38 as the shank 39 is pulled through the passage, the column decreases in diameter until it may be positioned in the hole as shown in Fig. 4. Also, the longitudinal extent or height of the column 38 is less than the thickness of the innerliner and fabric body of the tire, so that when the plug 8 is pulled through the hole, the column 38 will be extended or put under tension, with the result that outer flange 36 will be urged into its seat in sidewall 6. The inner flange 37 will be pulled against the inner surface of the tire to seal thereagainst. When shank 39 is released column 38 will try to recover its original length with the result that the outer and inner flanges 36 and 37 respectively will be put under compression against the outer and inner surfaces of the tire. The diameter of the column 38 in the position attained when seated is still greater than the diameter of the hole in which it is seated. Consequently the column of the plug is also under compression to seal against the surface of the walls of the passage. The result of this structure is that there is a seal around the peripheral surface of the flange 36 as well as on the inner face of that flange. A further seal is attained around the peripheral surface of the column 38 seated in compression against the tire fabric body portion while the flange 37 is under compression to bring its flat surface into sealing contact with the surface of the inner liner 7.

In the present invention, an extra thickness of rubber is provided by flange 37 against the inner liner around the peripheral edge of the opening of the molded hole. Referring to Fig. 4, it will be seen that the circular rubber flange 37 having a substantial thickness, is centered over the molded hole in the sidewall of the tire. The column 38 of the plug is under tension, and that brings the flat surface of flange 37 back against the surface of the plug, so that a seal is provided between the innerliner portion 7 and the plug at the face of the flange 37. The cords 25 of the body portion are covered with the extra thickness of rubber and protected from the inflation air of the tire cavity.

In one form of the invention the inner surface of flange 37 is cemented to the innerliner by a suitable cement to insure an air seal. In this form the surface of the inner liner around the passage is buffed or roughed up and cleaned with rubber solvent such as gasoline. The complementary surface of flange 37 is similarly treated. These surfaces are then cemented with a suitable rubber cement which is allowed to dry to a tackiness. Thereafter the two surfaces are pressed together and allowed to dry.

As an alternative form of the invention the rubber valve may be inserted in the sidewall and the entire assembly vulcanized to assure complete bonding of the valve to the tire.

After valve 8 is inserted through the hole and the flange 37 cemented to the inner liner, the shank 39 is pulled out from the sidewall and cut off along the line A—B (Fig. 4). Removal of shank 39 exposes the outer end of passage 40 so that communication is provided between the air cavity of the tire and the outside as shown in Fig. 1.

To provide entry for inflation of the tire, a conventional inflation needle is pushed through passage 40 until its end protrudes into the air cavity. After the tire is inflated and the needle removed, the passage 40 closes to seal against escape of air.

What is claimed is:

1. A tubeless tire and sidewall valve assembly, comprising a tire having a C-shaped wall comprised of a rubberized fabric body terminating at its edges in two annular beads with a rubbery sidewall superimposed on and bonded to said body, a rubbery air impervious inner liner covering the inner surface of said body from bead to bead, a hole completely through said sidewall, the walls of which form a valve seat extending through said wall having an enlarged outer portion and communicating with the inside and the outside of the tire, a valve plug mounted in said seat and pneumatically sealed against the surfaces thereof, said plug having an air passage extending longitudinally therethrough to communicate with the inside and the outside of the tire and having an inner flange having a flat surface normal with respect to said passage an outer flange symmetrical with and mounted in said enlarged outer portion, said surface being disposed against the inner liner and adapted to seal thereagainst to prevent the entry of air from the tire cavity into the fabric body adjacent said seat.

2. A tubeless tire and sidewall valve assembly according to claim 1 wherein the inner surface of the flange is bonded to the surface of the inner liner adjacent said seat and said flange is flush with the outer sidewall surface of the tire.

3. A tubeless tire and sidewall valve assembly according to claim 1 wherein the outer flange is larger than the enlarged outer portion to seat therein under compression.

References Cited in the file of this patent
UNITED STATES PATENTS

| | | |
|---|---|---|
| 670,725 | Pickett | Mar. 26, 1901 |
| 2,318,115 | Tubbs | May 4, 1943 |
| 2,634,785 | Tubbs | Apr. 14, 1953 |

OTHER REFERENCES

Publication: "Tires-TBA Merchandising," June 1956, page 47.